United States Patent [19]

Fender

[11] Patent Number: 4,673,376
[45] Date of Patent: Jun. 16, 1987

[54] UNIVERSAL COUPLING
[75] Inventor: Norman N. Fender, Hudson, Mich.
[73] Assignee: Graco Robotics, Inc., Livonia, Mich.
[21] Appl. No.: 886,120
[22] Filed: Jul. 16, 1986
[51] Int. Cl.[4] .............................................. F16D 3/18
[52] U.S. Cl. ................................. 464/158; 403/290; 403/90; 403/383
[58] Field of Search ............... 464/156, 158, 159, 150; 279/16, 42; 403/290, 114, 90, 383, 359

[56] References Cited

U.S. PATENT DOCUMENTS

| | | | |
|---|---|---|---|
| 1,351,712 | 8/1920 | Barry | 279/42 UX |
| 1,387,043 | 8/1921 | De Voe | 403/114 X |
| 1,779,057 | 10/1930 | Tolmach | 403/68 |
| 3,940,946 | 3/1976 | Andersen | 464/156 X |

Primary Examiner—Andrew V. Kundrat
Attorney, Agent, or Firm—Paul L. Sjoquist

[57] ABSTRACT

A universal coupler for flexibly joining together two members along an axis, wherein one member has a projecting neck having an enlarged curved polyhedron head, wherein each of the faces of the polyhedron have a radius of curvature measured in a plane parallel to the axis, and wherein the second member has a threaded end and an internal polyhedron receptor opening, the polyhedron opening being complementary to the head, and wherein the threaded end incorporates a plurality of slots running parallel to the axis, and a threaded locknut for fitting over the threaded end and for capturing the polyhedron head within the polyhedron receptor opening.

7 Claims, 5 Drawing Figures

UNIVERSAL COUPLING

BACKGROUND OF THE INVENTION

The present invention relates generally to universal couplers, and more particularly to a coupler permitting a predetermined amount of off-axis deflection and movement between coupled shafts, and for permitting torque transfer between the coupled shaft members.

The well known ball-and-socket coupler permits two members to be coupled together while providing for freedom of relative axial movement between the two members. The ball-and-socket coupler does not permit torque transmission between the two members, along an axis, because the two members are inherently freely rotatable with respect to one another. By equipping a ball-and-socket coupler with a threaded locking member, which locking member selectively compresses the socket about the ball, a certain amount of torque transmission is possible. However, in this type of construction the locking fit provided by the threaded locking member clamps the ball in the socket to prevent free axial movement of the two members being coupled. Such a device is illustrated in U.S. Pat. No. 1,779,057, issued Oct. 21, 1930, wherein a ball is captured within a socket and the socket is selectively clamped about the ball to provide degrees of relatively fixed adjustment of the ball with respect to the socket.

Another form of flexible coupler is shown in U.S. Pat. No. 3,940,946, issued Mar. 2, 1976. This patent discloses a universal joint for coupling two members, one member having a curved polyhedron head and the other member having a socket for receiving the curved polyhedron head with an interference fit. The polyhedron head is coated with an elastomeric material prior to forming the interference fit, to thereby permit the elastomeric material to deform under the various axial stresses encountered in use, permitting relative movement by the polyhedron head within the socket. The restrictive effect of the interference fit is thereby alleviated to permit some flexibility in relative axial movement between the head and socket.

To the extent that a universal coupler or universal joint is to be constructed free from backlash effects during torquing movements, either the dimensional tolerances between the respective head and socket must be maintained extremely critically, or some sort of cushioned interference fit must be provided. If close dimensioning tolerances are used the cost of the universal coupler increases through the need for finer machining tolerances. If a cushioned interference fit is created the cushioning material will eventually suffer degradation from wear, and the backlash effect will inevitably become more pronounced with use.

There is a need for a universal coupler having a very close dimensional fit between the head and socket member, while at the same time providing relatively free rotational coupling between the members, in a construction which the relative fit between the head and socket members will not degrade with operational use. Further, there is a need for a universal coupler wherein the relative design tolerance between the head and socket members may be relaxed so as to permit economical construction of these members, while permitting adjustment of the clearances to eliminate rotational backlash during rotational torque transmission.

SUMMARY OF THE INVENTION

The present invention includes a curved polyhedron head member, preferably a curved polyhedron head member having hexagonal sides, insertable into a complementary shaped socket. The socket has a plurality of cuts or slots extending inwardly from an end, and an exterior tapered threaded surface. A threaded locknut is fitted to the exterior threaded surface, thereby permitting selective compression of the interior walls of the socket to permit an adjustable fit about the polyhedron head. The locknut may be adjusted to eliminate all dimensional slack between the two members, and also to limit axial movement of the members relative to one another.

It is a feature and object of the present invention to provide a universal coupler having the adjustable capability of eliminating all dimensional tolerances and thereby controlling the rotational backlash between the two members.

It is another feature and object of the present invention to provide a coupling member having a polyhedron head which is controllably fitted into a mating socket to provide rotational torque transmission, and a limited degree of axial movement between the members affixed together by the coupler.

It is also a feature of the invention to provide a universal coupler wherein relative axial movement between the coupled members may be controllably limited.

BRIEF DESCRIPTION OF THE DRAWINGS

The foregoing features and advantages of the invention will be understood with reference to the appended specification and claims, and with reference to the drawings, in which:

DESCRIPTION OF THE PREFERRED EMBODIMENT

Figure 1:
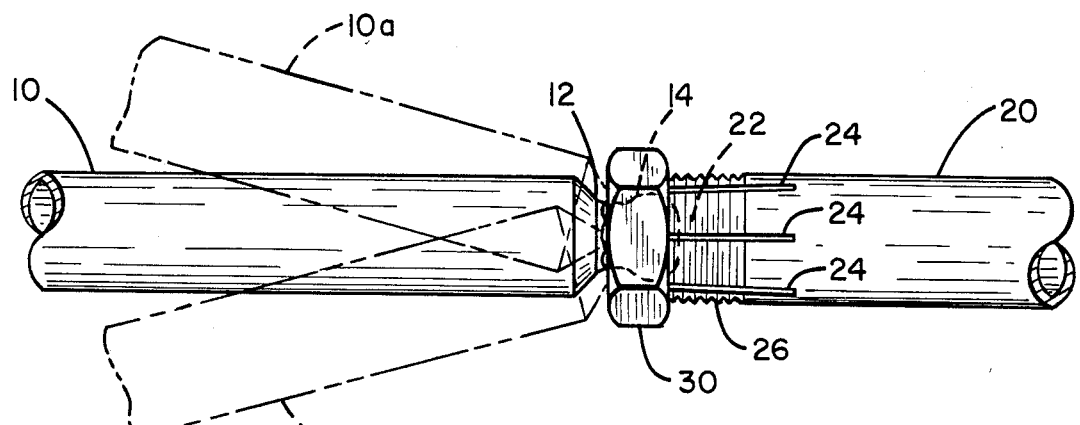
FIG. 1 shows an elevation view of the invention, in several relative positions of movement.

Referring first to FIG. 1, there is shown an elevational view of the invention. The form of the invention shown in FIG. 1 is that of a socket and head assembly affixed to shaft members, although the socket and head assembly may equally be affixed to any other construction having a need for the universal coupling features described herein. A shaft 10 has a tapered neck 12 affixed to an end, and a polyhedron head 14 is affixed on neck 12. A shaft 20 has a recess in its end, which recess forms a socket 22 for capturing head 14. A plurality of slots 24 are cut through shaft 20 into socket 22, and a tapered thread 26 is formed about the exterior surface of the end of shaft 20. A locknut 30 is threadably fitted over tapered thread 26, and the tightening of locknut 30 over thread 26 will cause a compression of the inner walls of socket 22.

FIG. 1 also shows, in dotted outline, the range of off-axis deflection permitted in the embodiment shown. The outline 10a illustrates an upper limit to this angular deflection, and the outline 10b illustrates the lower limit to this angular deflection. It is apparent that shaft 10 is freely movable in off-axis directions within the angular limits illustrated by outline 10a and 10b.

Figure 2:
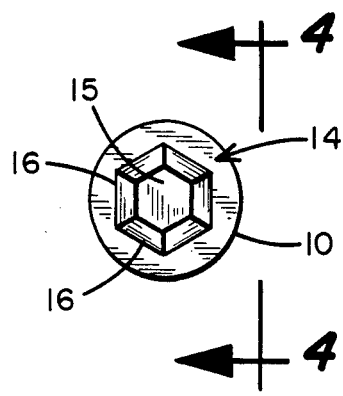
FIG. 2 shows an end elevation view of the polyhedron head.
Figure 4:
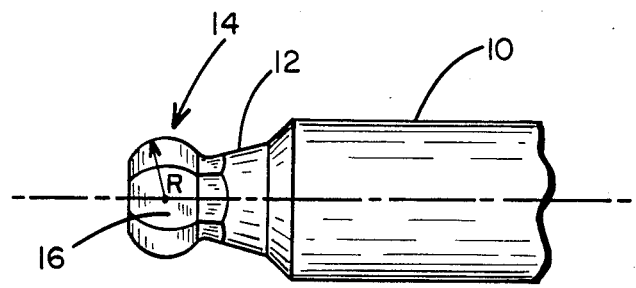
FIG. 4 shows a side elevation view of the polyhedron head, taken along the lines 4—4 of FIG. 2.

FIG. 2 shows an end elevation view of head 14 and shaft 10. Head 14 includes a front face 15, which may be either flat or curved, and a plurality of curved surfaces 16 arranged in a general geometric shape. The curved surfaces 16 are shown in a generally hexagonal form in FIG. 2, although other and more numerous surfaces 16 could be constructed in octogonal and other configurations. Each of the curved surfaces 16 is formed about a radius "R" taken from the axis of shaft 10, and proximate the midpoint of head 14, as is shown in FIG. 4. Radius "R" is selected to provide the necessary shaft deflection from the axis of shaft 10.

It is important to note that the arc of curvature lies in a plane parallel to the axis of shaft 10. The surface 16 is flat in the planes which are normal to the axis of shaft 10.

Figure 5:
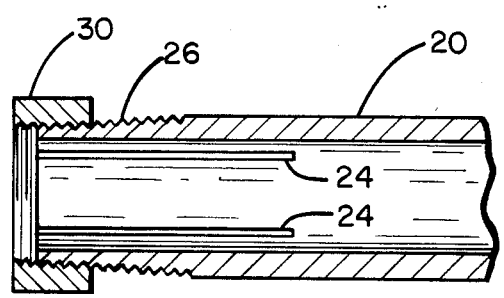
FIG. 5 shows a cross sectional view taken along the lines 5—5 of FIG. 3.

FIG. 5 shows an end view of shaft 20, and locknut 30, and in particular a view of socket 22. Socket 22 is formed of an interior wall configuration which is generally complementary to the geometric form of head 14. Socket 22 has a plurality of interior flat wall faces 25, in the example shown of hexagonal shape, to conform to the corresponding number of surfaces of head 14. Each of the faces 25 is separated from adjoining faces by a slot 24, thereby providing compressible flexibility of the individual wall sections formed about socket 22.

Figure 3:
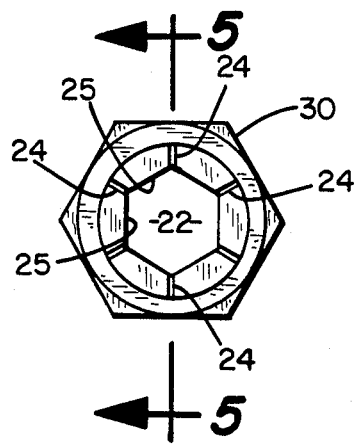
FIG. 3 shows an end elevation view of the socket.

FIG. 5 shows a cross sectional view taken along lines 5—5 of FIG. 3, wherein shaft 20 and locknut 30 are shown in cross section. The taper of thread 26, from a smaller diameter at the end of shaft 20 to a larger internal diameter, is evident from the figure. Slots 24 extend at least through the distance of thread 26, and preferably extend beyond the end of thread 26 in order to provide sufficient resiliency of the sections formed therebetween.

In operation, the polyhedron head 14 is inserted into socket 22 with locknut 30 at its loosest point. The relative dimensions of head 14 and socket 22 are selected so as to permit the insertion of head 14 into socket 22 under these conditions. Locknut 30 is then drawn tighter over thread 26, until the inner surfaces of socket 22 are compressed against head 14 to the desired degree of flexibility of movement. The adjustment of locknut 30 should permit head 14 to be nearly in interference fit relationship inside socket 22, thereby eliminating all possibility of backlash. Over extended periods of use, in the event wear occurs between the facing surfaces of head 14 and socket 22, it is merely necessary to readjust locknut 30 to take up any slack which may have occurred as a result of wear. In most cases it may be appropriate to provide grease or other lubricant in the interior of socket 22 in order to facilitate free movement of the two members.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A universal coupler for attaching two members together along an axis and for permitting limited off-axis displacement of either of the members and for transmitting rotational torque therebetween, comprising
    (a) a male coupler affixed to one of said members, said male coupler comprising a narrowed neck portion and a curved polyhedron head attached thereto and having a plurality of curved faces;
    (b) a female coupler affixed to the other of said members, said female coupler comprising a socket having interior polyhedron faces corresponding in number to said polyhedron head curved faces, and having a plurality of slots therethrough, each slot separating adjacent polyhedron faces, said female member further comprising a tapered exterior threaded portion extending substantially over said socket and at least partially along said slots; and
    (c) a threaded locknut fitted to said threaded portion.

2. The apparatus of claim 1, wherein said polyhedron head further comprises six curved faces in hexagonal relationship.

3. The apparatus of claim 2, wherein said curved faces are formed by a radius from a point along said axis.

4. The apparatus of claim 1, wherein said socket interior polyhedron faces each further comprise a smooth face running parallel to said axis.

5. The apparatus of claim 4, wherein said polyhedron head further comprises a plurality of curved faces wherein each arc of curvature lies in a plane parallel to said axis.

6. The apparatus of claim 5, wherein said polyhedron head further comprises six curved faces in hexagonal relationship.

7. The apparatus of claim 6, wherein said curved faces are formed by a radius from a point along said axis.

* * * * *